United States Patent [19]
Kilmer et al.

[11] Patent Number: 6,078,326
[45] Date of Patent: Jun. 20, 2000

[54] SYSTEM AND METHOD PROVIDING CENTRICITY USER ENVIRONMENT

[75] Inventors: Richard A. C. Kilmer, Centreville; Scott J. Dankman; David B. Craine, both of Alexandria, all of Va.

[73] Assignee: Roku Technologies, L.L.C., Chantilly, Va.

[21] Appl. No.: 09/255,411

[22] Filed: Feb. 22, 1999

Related U.S. Application Data

[62] Division of application No. 08/636,574, Apr. 23, 1996, Pat. No. 5,874,954.

[51] Int. Cl.⁷ ........................................................ G06F 17/30
[52] U.S. Cl. ........................................... 345/353; 345/356
[58] Field of Search .................................... 345/335, 352, 345/353, 346, 333–334, 340, 341–347, 339, 327, 356, 357; 395/200.3

[56] References Cited

U.S. PATENT DOCUMENTS 5,878,423  3/1999  Anderson .............................. 707/100

OTHER PUBLICATIONS

Chen, H., et al, "Internet Categorization and Search: A Self Organizing Approach", J. of Visual Comm. & Image Representation Mar. 1996, vol. 7, No. 1, pp. 88–102.

Weintraut, J. N. et al, "The Internet–Industry Report," Hambrecht & Quist Inc., New York, Sep. 22, 1995.

"Aeneid Corporation Creates the Internet Information–Exchange" PR Newswire Association Inc., May 17, 1999, pp. 1412.

"Verity Ships Knowledge Organizer," Business Wire, Mar. 22, 1999, pp. 1250.

*Primary Examiner*—Steven Sax
*Attorney, Agent, or Firm*—Fenwick & West LLP

[57] ABSTRACT

A processing architecture includes an object instantiation and interaction engine, an CUE interface, and remote processes to create, access, and process objects in a distributed manner. The CUE interface uses an interface wheel divided into portions denoted who, what, when, where, why, how, and now. Selection of a particular portion provides the user with control related to that portion. The interface is adaptable for use with a wide variety of machines, including computers, televisions, telephones, security systems, and automobiles. The wheel is implemented as a display on a video monitor or as a physical disk. Each portion of the wheel is assigned a color that serves as a mnemonic for that portion. A hierarchical network of engines provides distributed storage and access to data in conjunction with the CUE interface.

4 Claims, 15 Drawing Sheets

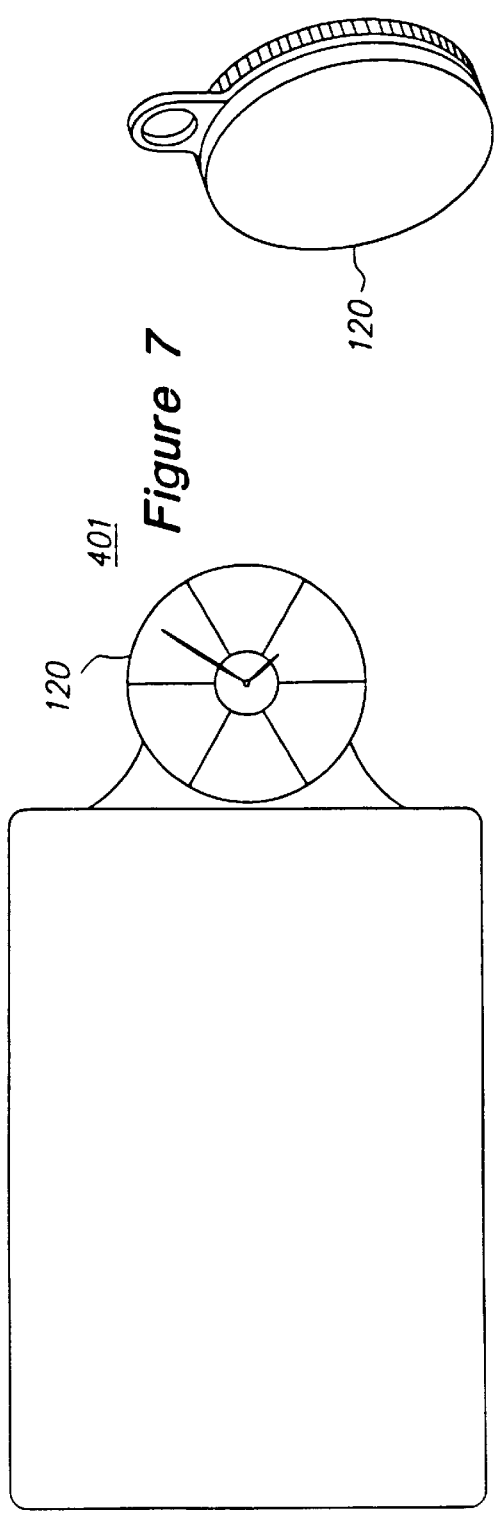
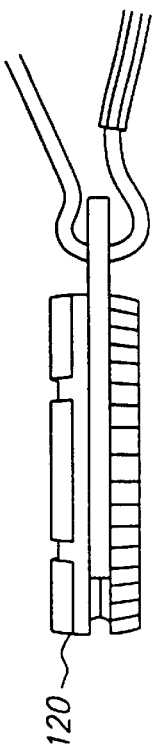
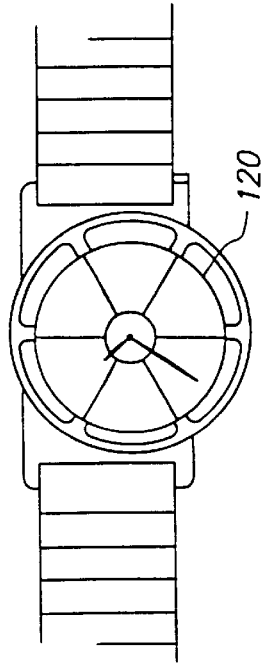

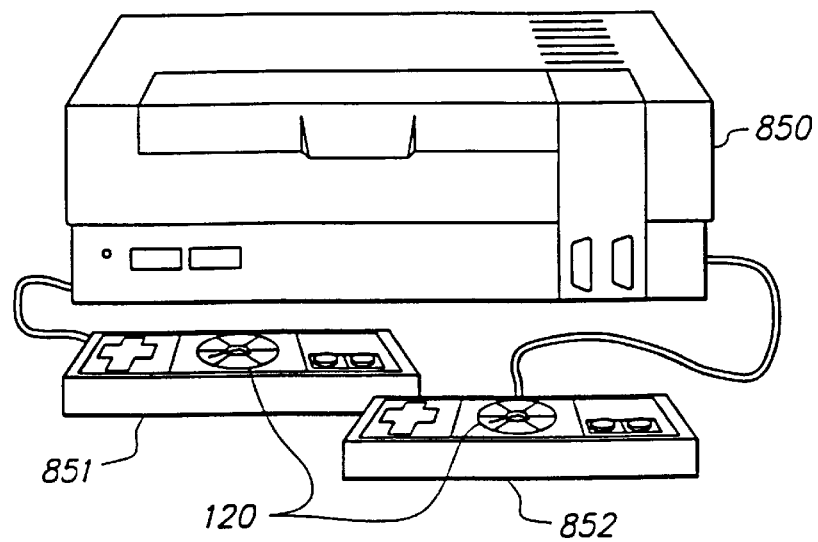
Figure 13
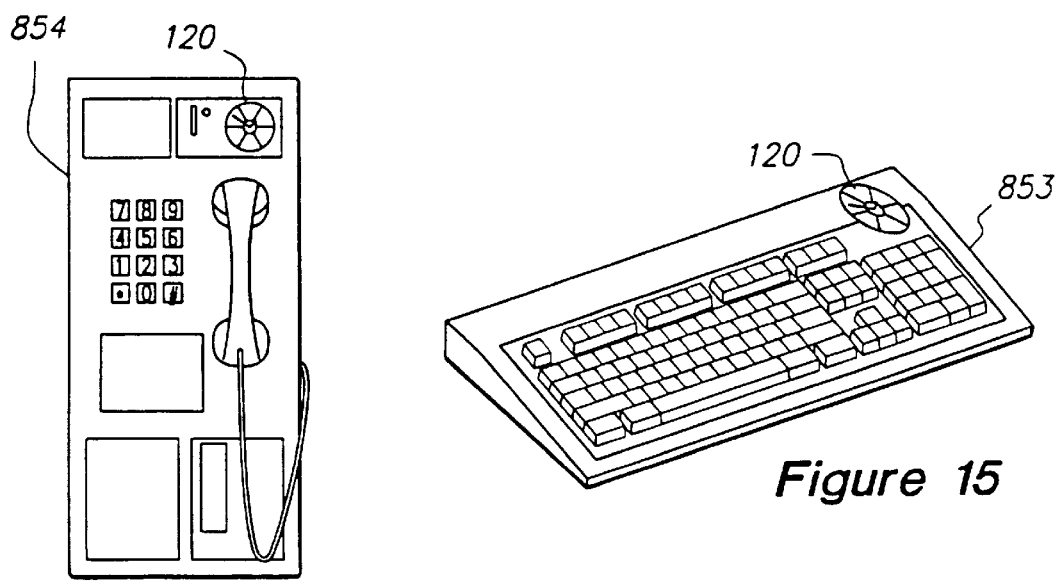
Figure 14
Figure 15

6,078,326

SYSTEM AND METHOD PROVIDING CENTRICITY USER ENVIRONMENT

This application is a divisional application of U.S. patent application Ser. No. 08/636,574, filed on Apr. 23, 1996, which is incorporated by reference herein in its entirety. U.S. Pat. No. 5,874,954.

37 C.F.R. 1.71 AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office records, but otherwise reserves all copyright rights whatsoever.

BACKGROUND OF THE INVENTION

This invention relates generally to computer systems and specifically to systems and processes for providing a computer architecture for a centricity user environment.

Since the industrial revolution, it has become common for people to rely on machines for innumerable tasks. As the use of more complex machines becomes ever more widespread, the need increases for interaction between humans and machines to become more efficient, simple, consistent, intuitive, and flexible.

Traditionally, human-machine interfaces have taken a form specific to the purpose of the machine. A telephone, for example, includes a dial or keypad for selecting numbers and electro-acoustic transducers for converting between sound and electrical energy. An automobile includes various interface components for selecting the speed and direction of the automobile. A present-day computer provides a graphical user interface using the metaphor of a desktop.

Unfortunately, as the number of machines used in everyday tasks increases, the inefficiencies introduced by having machine-specific interfaces increase commensurably.

In the area of computers, the need for a user environment that is powerful, flexible, and easy to use is particularly acute. Early user environments were arcane and difficult to use by anyone other than highly-trained computer operators and programmers. Punched cards, for example, provided a user environment that was powerful for solving many problems but was beyond the reach of an unsophisticated user. More modern operating environments adopted familiar metaphors such as that of an office or a desktop, allowing less experienced users to intuitively navigate through the environment to operate the computer, and access information.

As the diversity of information types, and increasingly the need to distribute the access to this information has evolved, more modern operating environments such as the "World Wide Web" (or "Web") have grown in popularity. The Web is a collection of computer servers organized in a peer-to-peer structure in which each server bears an equal, rather than hierarchical, relation to each other server. The Web provides links that connect one server to another, and in general, access from a first server to a second server is provided only by links that are provided, on a predetermined basis, by a "page" supplied by the first server. In this environment, a page is a model for relationships among linked objects. The page model includes both information content such as text and graphics, as well as links to other pages. In the context of this environment, links are simply mechanisms for establishing a unidirectional relationship between two objects. Links known as universal resource locators (URLs) are pointers from a current Web page to another Web page or other location (such as an "FTP" site) provided either by the same server or by a different server. If information desired by a user of the Web environment is not provided on a page supplied by the first server, the user must search for links to other pages provided by the first server, or by a second server. Commonly, links to numerous additional servers are required in order to find a server that provides the desired information.

Although some Web servers include search engines for automating information searches, the Web environment does not lend itself directly to any organized and efficient mechanism for accessing information other than that created by the system administrator. Thus, information retrieval using the Web environment is inefficient, uncertain, and inconsistent.

Therefore, a need remains for a more efficient user environment that can be used across a wide array of devices and can be applied to a wide range of tasks. No systems are currently known that adequately meet such a need.

SUMMARY OF THE INVENTION

In accordance with the present invention, a computer architecture includes an object instantiation and processing engine (hereinafter, a "CUE engine") and a CUE interface operatively connected to the CUE engine, the CUE engine creating and processing objects based on user commands provided by the CUE interface, the CUE interface operating according to a who, what, when, where, why, how metaphor.

In another aspect of the invention, processing of the objects is distributed among the CUE engine and the CUE interface.

In a further aspect of the invention, the CUE interface is remotely located from the CUE engine.

In yet another aspect of the invention, each of the objects corresponds to a category of the who, what, when, where, why, how metaphor.

In a further aspect of the invention, link objects establish correspondence among other objects and transport objects provide movement of other objects.

In another aspect of the invention, objects are linked into associative networks.

Further in accordance with the present invention, a method of providing a processing architecture includes creating and processing objects by a CUE engine; and accessing the objects by a CUE interface operating according to a who, what, when, where, why, how metaphor.

Still further in accordance with the present invention, a method of providing a computing environment includes presenting an interface wheel; accessing items relating to personas in response to user selection of a "who" portion of the wheel; accessing items relating to events in response to user selection of a "when" portion of the wheel; accessing items relating to locations in response to user selection of a "where" portion of the wheel; accessing items relating to goals in response to user selection of a "why" portion of the wheel; accessing unstructured items in response to user selection of a "what" portion of the wheel; and accessing resources in response to user selection of a "how" portion of the wheel.

In accordance with another aspect of the invention, the method further includes accessing current active items of any sort in response to user selection of a "now" portion of the wheel.

In accordance with still another aspect of the invention, the "who" portion, the "what" portion, the "when" portion, the "where" portion, the "why" portion, and the "how" portion each comprises substantially a radial wedge of the wheel.

In accordance with still another aspect of the invention, the "who" portion, the "what" portion, the "when" portion, the "where" portion, the "why" portion, and the "how" portion are each provided with a distinct mnemonic color. In one specific aspect, the "who" portion is magenta, the "what" portion is blue, the "when" portion is cyan, the "where" portion is green, the "why" portion is yellow, and the "how" portion is red. In another aspect, the "now" portion is also provided with a distinct mnemonic color. In a specific aspect, the "now" portion is white.

In accordance with a further aspect of the invention, the "now" portion is disposed as a hub of the wheel. In a related aspect, the "now" portion is represented by an analog or digital clock.

In accordance with other aspects of the invention, the wheel is implemented as a display on a video screen and as a physical disk.

In accordance with still other aspects of the invention, the wheel is detachably mounted to a machine and is exchangeable among multiple machines.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 7 is an illustration of a PC-MCIA card adapted for use with an interface wheel in accordance with the present invention.

FIG. 8 is an illustration of a pocket watch adapted for use with an interface wheel in accordance with the present invention.

FIG. 9 is an illustration of a keychain adapted for use with an interface wheel in accordance with the present invention.

FIG. 10 is an illustration of a watch adapted for use with an interface wheel in accordance with the present invention.

FIG. 13 is an illustration of an electronic game adapted for use with an interface wheel, in accordance with the present invention.

FIG. 14 is an illustration of a pay telephone adapted for use with an interface wheel, in accordance with the present invention.

FIG. 15 is an illustration of a keyboard adapted for use with an interface wheel, in accordance with the present invention.

DETAILED DESCRIPTION OF THE DRAWINGS

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
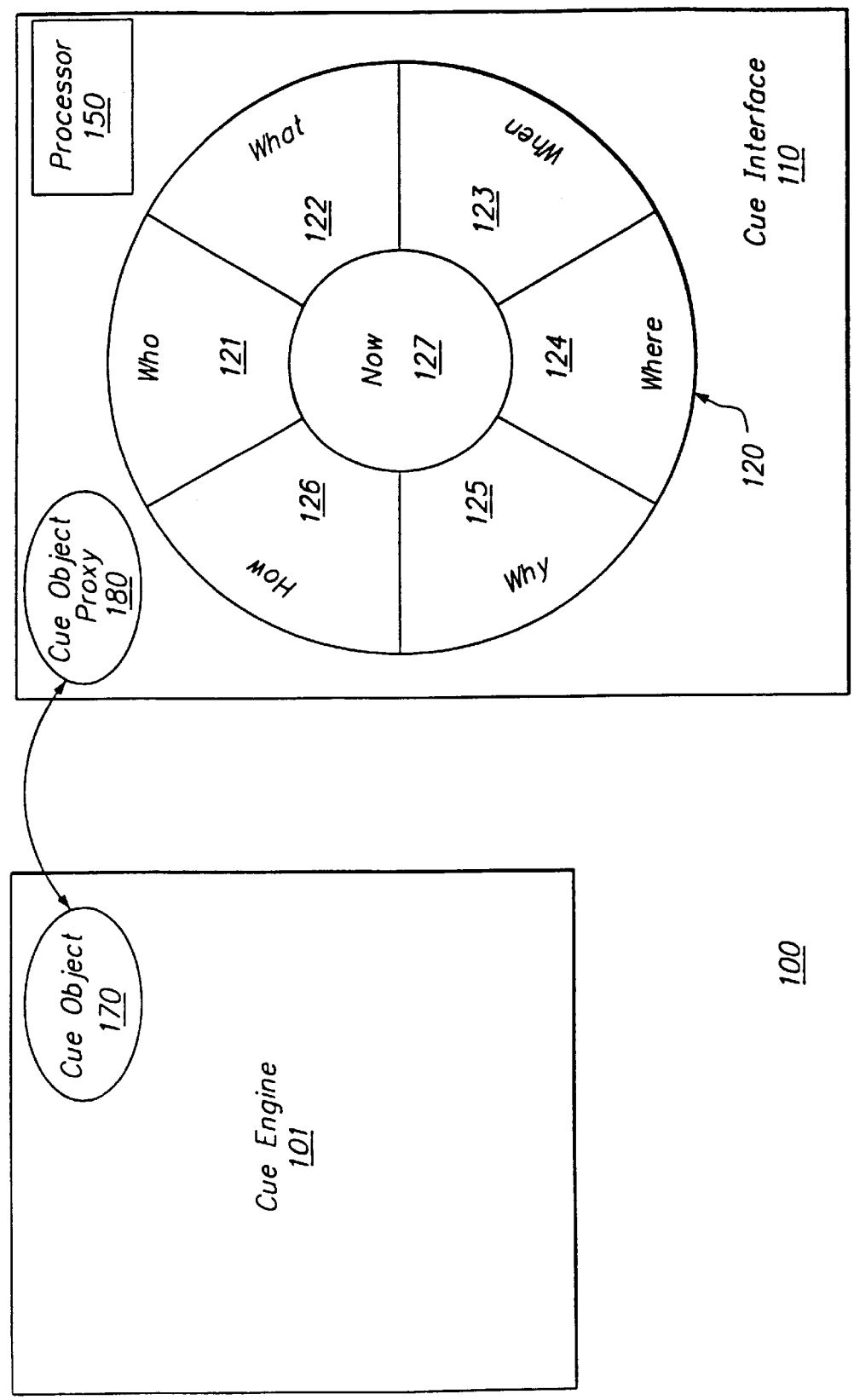
FIG. 1 is a block diagram of a processing architecture in accordance with the present invention.

Referring now to FIG. 1, there is shown a processing architecture 100 in accordance with the present invention. As set forth in greater detail below, architecture 100 is configured to provide an environment in which processing is widely distributed but appears to the user to be based entirely on the user's particular needs. The notion that processing may be widely distributed while in fact appearing to be centered entirely around a particular user's needs is suggested by use of the shorthand phrase "Centricity User Environment" or "CUE" that is variously applied to elements of architecture 100, where the term "centricity" refers to that which is situated at the center, and, in the nomenclature of architecture 100, identifies the current information item that the user is looking at.

The primary components of architecture 100 are CUE engine 101, CUE interface 110, and object 170. Briefly, CUE objects, e.g., 170, are created, processed, and managed by CUE engine 101. Access to such CUE objects is provided by CUE interface 110, which presents the user with a who, what, when, where, why, how metaphor for interaction.

Functionally, architecture 100 provides a collection of six distinct classes of CUE objects, corresponding to the who, what, when, why, where, how categories. Conventional object-oriented processing concepts and terminology are used herein to describe the operation of architecture 100. For example, as used herein, the term "object" denotes an instance of some predefined class of objects. An object contains instance data (i.e., states) and instance methods (i.e., interfaces). A "proxy object" 180 for a given object 170 is a type of object that presents the interfaces of the given object 170. Proxy objects, e.g., 180, attach to corresponding "remote" objects, e.g., 170 in a remote CUE engine, e.g., 101. A proxy object includes the methods that package method invocations for execution on a corresponding remote object.

Architecture 100 groups all data to be processed into one of the six classes outlined above or a subclass thereof. Objects thus created are then available for access, interaction, and other processing as needed. Architecture 100 is configured to provide flexible processing that can encompass a variety of applications that conventionally are not easily combined, including applications for computer based communications, document management, group scheduling, multi-party collaboration, workflow management, project management, resource management, etc.

Processing of such objects may be performed, as suggested by FIG. 1, by CUE engine 101 or CUE interface 110.

Figure 3:
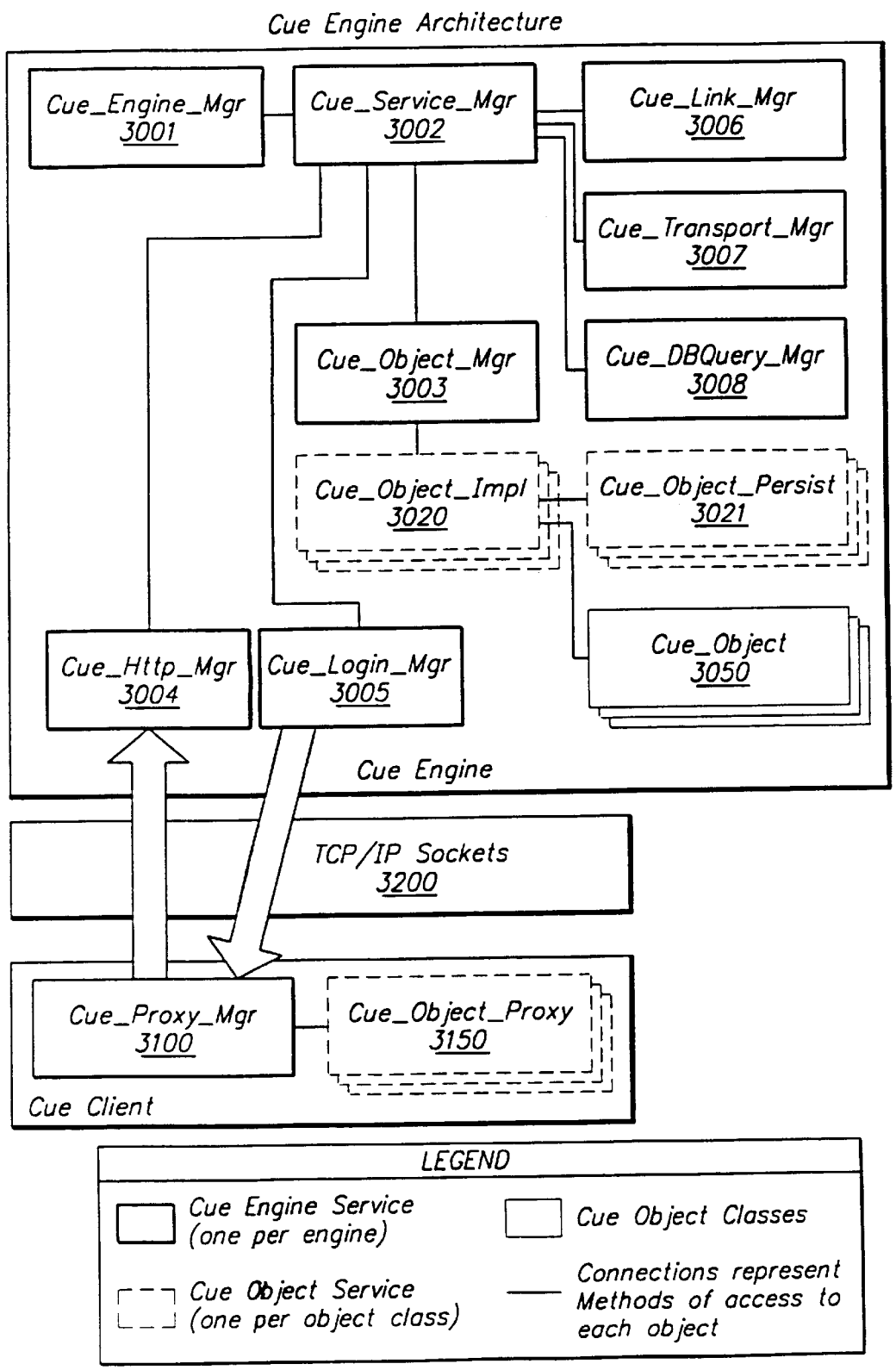
FIG. 3 is an illustration of a CUE engine architecture in accordance with the present invention.

Referring now also to FIG. 3, there are shown the components of CUE engine 101 in a preferred embodiment. The purpose of CUE Engine 101 is to create, store, and allow for the interaction of CUE Objects, e.g., 170, 3050, CUE Link Objects and CUE Transport Objects. CUE Engine 101 is composed of eight classes of CUE Engine Service (CES) objects and two classes of CUE Object Service (COS) objects. The CES classes all inherit from the CUE_Service class which contains default behavior for each CES class. The CUE_Engine_Mgr 3001 is the initial boot up object. It starts all the other CES objects. The first CES object created is an instance of the CUE_Service_Mgr 3002 class, and then the other CES objects are started and passed the CUE_Service_Mgr reference to use for referencing other services. The CUE_Service_Mgr object's function is to be a registrar of all available CES objects running in the system. It functions as a directory that other objects may use to locate a particular service. Each CES object registers itself with the CUE_Service_Mgr upon startup. The CUE_Object_Mgr 3003 class is used to handle all events related to remote service requests and stores within it a table and location of all CUE_Objects in memory. The CUE_Object_Mgr 3003 also creates the COS objects as necessary depending on the type of object request that needs to be fulfilled. FIGS. 17–22 provide additional detail concerning objects used in implementing a preferred embodiment.

The COS classes consist of the CUE_Object_Impl and CUE_Object_Persist classes. One other set of COS classes exists for remote object access, the CUE_Object_Proxy 3150 classes. Their function is to appear as local objects but package up calls to remote objects. Normally, this set of COS classes resides on the CUE Client but could also exist in the engine in the event that the engine needed remote access to another CUE Engine's objects. The CUE_Object_Impl represents a superclass of all Impl classes, one for each type of CUE Object in the system (e.g., Who_Impl, What_Impl, When_Impl . . . Person_Impl . . . Tool_ImpI) Each Impl class is used by the CUE_Object_Mgr to invoke method calls received as part of a proxy remote method invocation request. The CUE_Object_Persist class mirrors the CUE_Object_Impl class in that a version is created for each CUE Object class in the system. The purpose of the Persist classes is to save and restore the state of the CUE Objects into the database. The CUE Objects themselves use the Impl and Persist classes to initiate the storage and retrieval of their state.

The CUE_Http_Mgr 3004 and CUE_Login_Mgr 3005 act together to coordinate the communications with the CUE_Proxy_Mgr 3100. The CUE_Proxy_Mgr is responsible for transmitting method invocation requests from the CUE_Object_Proxy 3150 classes (see above) to the CUE_Http_Mgr via the CUE HTTP method. This method represents an extension of the standard HTTP protocol. The CUE_Login_Mgr handles user/password authentication and maintains the connections back to each CUE_Proxy_Mgr connected to it to allow for the reply to the method invocation to be transmitted. Multiple clients can be connected to the same engine at the same time in this fashion. The method invocation request arrives from the CUE_Http_Mgr to the CUE_Service_Mgr which verifies the availability of the requested service and sends the request to the appropriate CES object. The CUE_DBQuery_Mgr 3008 class is available for accessing and querying the underlying database of CUE Objects. The reason to package this in a standalone object is to allow for the remote and local access to database features without knowing the database query language, database structure, or database technology used as the storage mechanism. One use of the CUE_DBQuery_Mgr object is to query for the class of any particular object. This feature is used by the CUE_Object_Mgr when an object is requested and needs to be instansiated for local or remote access. The CUE_Link_Mgr 3006 and CUE_Transport_Mgr 3007 classes are detailed below.

The purpose of links is to establish a semantic binary relationship between CUE Objects. By semantic binary relationship we mean that each link conveys some meaningful information about the relationship between the two objects. For example, a Person object can be related to a Group object by a link of type "employed by". The link conveys meaning by use of a link type called "employed by". The link is binary since the relationship of "employed by" automatically is associated with its converse relationship "employs". Thus, from this one link we know that the Person is employed by the Group and the Group employs the Person.

A link consists of the following components: Link OID, Link Type Designator, and two OIDs. The Link OID is the unique identifier for the Link object itself. It contains, among other things, a one byte field that indicates what category of objects are being linked together (i.e., Who, What, When, Where, Why, or How). The Link type Designator is an integer that represents a particular type of link. Link Types are defined in a separate database table. The link type gives semantic meaning to the link. The CUE Engine will ship with a set of predefined link types, but users are free to create their own as well with the understanding that locally defined link types will only have meaning within the context of the creator's CUE engine. The two OIDs are of the objects that are being linked together.

Links are persisted to a link database implemented by CUE_Link_Mgr 3006. The link database is structured as 21 tables, each storing links that correspond to the 21 different combinations of links among the 6 categories of CUE objects (i.e., Who-Who, Who-What, Who-When, etc).

An instance of the CUE_Link_Mgr (3006) class provides the mechanisms for searching the link database as well as adding links, deleting links, and persisting the database. Links are created when the CUE_Link_Mgr is requested to add a link by another object. The link manager first invokes the LinkEvent method on each of the objects being linked to notify them that a new link is being created between them. For the link to be successful, each object must return a value of "true" to the link manager. Objects may optionally override this inherited method to perform some processing before returning a value to the link manager. Deletion of links works the same way except that the link manager sends a link deletion notification via the LinkEvent method on each object. In both cases, if either object returns something other than "true", the creation/deletion will fail. If both return a "true", then the link is created and persisted to the link database.

The purpose of Transport Objects is to provide a mechanism for moving Info Objects and Link Objects between CUE Engines.

A Transport object is composed of attributes and methods for streaming Info and Link Object attributes into and out of the Transport object. It also contains a Source person and location OID and a Destination person and location OID to identify the source location and the destination location.

Transport objects are accessed via the CUE_Transport_Mgr 3007 class. The CUE_Transport_Mgr provides methods for creating, deleting, sending, and receiving transport objects.

The purpose of networking CUE Engines together is to provide the capability for users to move from location to location and still have access to the databases in their home CUE engine. To accomplish this it is necessary that the CUE Wheel Disk contain not only the Who information of the user, but the Where OID of the home CUE engine and the What OID of the CUE Database. When the user starts the CUE System, he will then be given a choice of attaching to the local CUE Engine or a remote one as specified by the CUE Wheel Disk. If the user elects to connect to his home engine, the home engine creates a proxy object to the Where object representing the user's current location. A "uses resources at" link is also created between the user's Who object and the Where proxy object of the home machine. In this way, the user then has access to all the information in his home CUE engine and all the resources in the local CUE engine.

CUE interface 110 is implemented, in a preferred embodiment, by a conventional processor 150 conventionally programmed to provide a graphical user interface wheel 120.

Interface wheel 120 is subdivided into seven portions: A "who" portion 121, a "what" portion 122, a "when" portion 123, a "where" portion 124, a "why" portion 125, a "how" portion 126, and a "now" portion 127. Selection of portions 121–127 by a user causes CUE interface 110 to provide the user with control of actions related to those portions and provides the user with objects, e.g., 170, related to those portions. CUE interface 110 is not specific to a particular type of processor or other machine, but is immediately and readily adaptable to provide an environment for human interaction with virtually any type of machine, as discussed further below.

In a preferred embodiment, CUE interface 110 is located at a user site and CUE engine 101 is implemented remotely, e.g., from server processors connected with CUE interface 110 via a conventional computer network.

Figure 2:
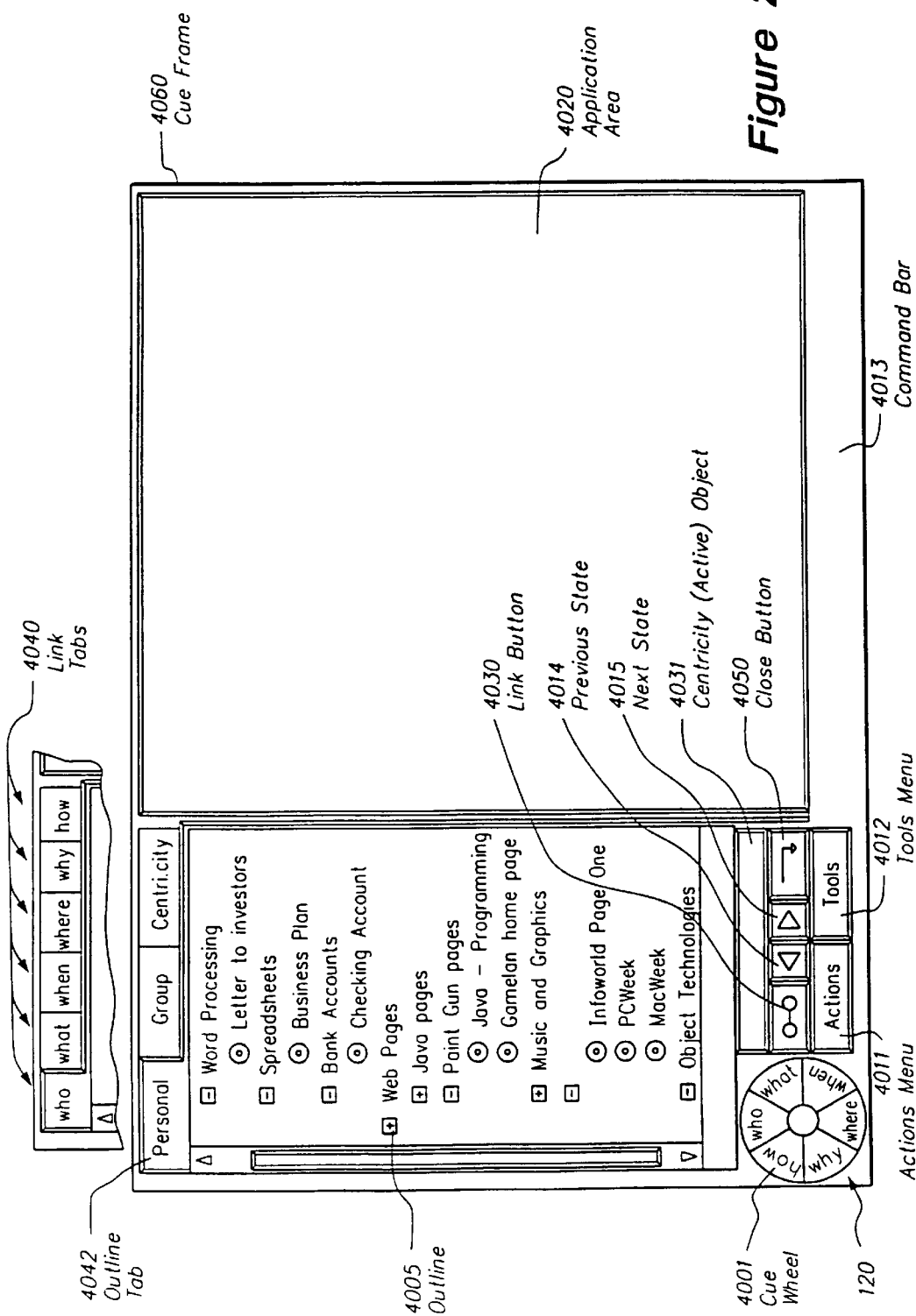
FIG. 2 is a diagram of CUE interface components in accordance with the present invention.

Referring now also to FIG. 2, CUE interface 110 consists the following visual components: CUE wheel control 4001, tab controls 4040, 4042, outline area 4005, link button 4030, previous state button 4014, next state button 4015, centricity (active) object area 4031, dose button 4050, actions menu button 4011, tools menu button 4012, command bar 4013, and an application area 4020, all contained within a cue frame 4060. The CUE wheel control 4001 is located at the bottom left corner of the screen and is described in detail below. Tab controls consist of a row of tabs that can be in one of two possible states. If there is no centricity (active) object, tab controls 4042 are displayed. Tab controls 4042 are labeled Personal, Group, and Centricity and represent a scope of view of the user to corresponding personal, group, or global (CentriCity) object engines within their current active class of object (i.e., Who, What, When, Where, Why, How). If there is an active object, tab controls 4040 are displayed. Tab controls 4040 are labeled Who, What, When, Where, Why and How and reflect the categories of objects that are linked to the active object. Command Bar 4013 includes an actions menu button 4011 and a Tools menu button 4012 in addition to the Cue wheel 4001 that is used to control the display of information. Each if these components is described in detail below.

CUE Wheel

The CUE wheel 4001 is located in the bottom left-hand corner of the screen and consists of six evenly sized segments filled with the colors: magenta, blue, cyan, green, yellow, and red. Each segment represents one of the six CUE categories in respective order: who, what, when where, why and how. The segments are arranged such that the magenta/who portion is at the top and the others follow around in dockwise order. The center hub of the CUE wheel is colored white and represents the Now of the CUE system. Clicking on any one of the pie segments causes the Tab control for that CUE category to be displayed. Clicking on the now portion of the wheel causes a list of current activities within the system to be displayed.

The CUE wheel also serves as the drop location for unstructured data that the user wants to enter into the CUE System. In other words, data that the user encounters that is either outside the CUE System (e.g., data from an application in the Application Window) can be converted into CUE objects by first dragging it from the source location and dropping it on the Wheel. The dropped data are stored in a holding area in the Now where the data can then be processed at a later time.

Tab Control

The tab controls 4040, 4042 are used to access different logical pages of information within architecture 100. As mentioned above, there are two states for tab controls. When a user dicks on the CUE wheel 4001 to display a particular class of information, any active object is deactivated, and an outline for the selected class of object is displayed in outline area 4005. In this scenario, the tab controls 4042 are displayed representing the CUE engines available to the user. The Personal tab represents the objects in the personal CUE engine, the Group tab represents a summation of the objects in the Group engine(s) hierarchically located above the user, and the CentriCity tab represents the summation of the objects in the CentriCity engines hierarchically located above the user. These hierarchies are described in greater detail below in connection with FIG. 16.

Each of the outlines displayed upon selection of an outline tab control 4042 presents the user with a list of all available CUE objects in the selected category, e.g., all Who objects. The outline data include headings and CUE object hyperlinks. The headings reflect the type of category of information being displayed, as illustrated in the outline area 4005 of FIG. 2. The user can add or remove headings as desired, although in a preferred embodiment standard headings that cannot be deleted are present in each category. The user can toggle each such heading to be opened (expanded) or closed (contracted), and can rearrange headings by dragging and dropping, by conventional use of a pointing device such as a mouse.

CUE hyperlinked objects are represented, for instance, by "Letter to investors" under the Word Processing heading in FIG. 2. The bullet icon and text name for each such object is given a color in accordance with the mnemonic color associated with the class of that object, as described herein. When the user selects one of these objects, it is activated and becomes the centricity (active) object. Summary information for that object is then displayed in application area 4020, and outline tab controls 4042 are replaced with link tab controls 4040. The link tab controls 4040 reflect the various categories of objects that are linked to the active object. If there are no elements under a particular tab, the tab is disabled and it is displayed in a conventional "grayed-out" manner indicating that it is disabled. Outline area 4005 displays the linked objects arranged by link type. For instance, a company XYZ may be linked to a person John Doe by the link type "employs". These link types form the headings in outline area 4005 and the linked objects are shown as hyperlinks in the same fashion as described above. If a user clicks on one of these objects, it becomes the centricity object and the previous centricity object is deactivated. To revert to the previous object, the user selects previous state button 4014; to then revert again to the new object, the user selects next state button 4015. Deletion of headings is conventionally accomplished by dragging the heading icon into a trash can display.

Interface Controls

The Interface controls consist of the following items each of which is described in detail in this section: Next State 4015 and Previous State 4014 navigation buttons, Actions button 4011, Tools button 4012, Active Object Display Area 4031, a Link button 4030, and a close button 4050.

The Next State and Previous State navigation buttons are used to navigate through active objects' state changes. In other words, as a user clicks on a CUE hyperlink in the Tab control, the active object changes and the Tab control is updated with information on the new active object. However, the previous display is remembered and can be retrieved by clicking the Previous button. In fact, all previous states are remembered for the life of the session. To handle the branching problem that arises from traversing forwards and backwards through hyperlinks, the Forward button will cause to be displayed a list of hyperlink choices when a split condition arises.

The Actions button, when clicked, displays a popup menu listing actions that can be performed by the user with the currently active object. The actions that are available to the user are dynamically determined by the system at runtime based on the Resource objects (a subclass of How object) that are accessible by both the user's Person object and the active object.

Resource objects are actually linked to Where objects since resources are available at specific locations. Software resource objects, for example, would be linked to a Where object that represented a computer. As a result, Who objects are not directly linked to Resource objects. This means that to get a list of resources that are available to a Who object, one must first find the Where object that contains those resources. A Who object that is linked to a Where object with the link type "uses resources at" has access to the resources linked to that Where object. When searching for resources associated with a Who Object, the system looks for links between the Who object and any Where objects that are of type "uses resources at". The system then searches for Resource objects linked to those Where objects.

The Action Object (a subclass of Why object) that is linked to those Resource objects then forms the content of the Actions menu. For example, in browsing the Who outline a user can select a Person object (which is a subclass of a Who object). An action that might typically be performed with this Person object could be "send email". For this action to be available in the Actions menu, the active Person object and the user's own Person object must both be linked to an Email Box resource object and the user's Email box resource must be linked to the "send email" Action object.

The Tools button, when clicked, displays a popup menu listing software tools that are available to the user. Selecting a tool from this popup menu causes it to be launched and displayed in a floating window.

The Link button is used to generate links to objects. When the user clicks the Link button, the system goes into "Link Mode" which means that the current active object is locked and is not changed when the user dicks on a CUE hyperlink. In fact, when a user clicks on a CUE hyperlink, a popup menu is displayed detailing a list of link types that can be created between the current active object and the selected object. If the user selects one of these link types from the menu, the system will create a link object that links the current active object and the object on which the user clicked. In this way, the user can easily create multiple links between objects. Clicking the Link button again causes the system to exit "Link Mode".

The active object display area displays the name of the currently active object in the mnemonic color of the CUE category that the object belongs to.

Applications Area

The Applications Area occupies the right half of the screen and is the location where embedded applications run. Any embedded application (i.e., an application that can run within the CUE environment) is displayed in this area. Examples of such applications are: Web browser, email client, text editor, and a CUE object viewer for each CUE object class.

Cursor

Since the CUE System relies upon color as a means to identify the categories of links to the user, consideration needs to be given to users who are color blind. So, an option on the system will be to enable Cursor Effects. When enabled, the cursor will change shapes when it hovers over a link. Six unique shapes are used, each one corresponding to one of the CUE categories.

It should be recognized that the architecture 100 illustrated in FIG. 1 is a generalized representation and could take a variety of specific forms as required for any particular application. Examples of implementations for architecture 100 extend beyond conventional desktop computer systems and include office equipment, home appliances, consumer electronic devices, automobiles, and any other devices that call for interaction with users. In a sampling of possible embodiments, processor 150 is implemented by the microprocessor of a conventional general purpose computer, an electric motor-driven device, an electronic television receiver circuit, or a drivetrain of an internal combustion engine. The discussion that follows will generally focus on an embodiment using general purpose computers, but it should be recognized that the description can readily be applied to use of other devices as well.

CUE interface 110 is centricity based in that it provides an environment centered on which category of information a user wants to work through to accomplish his or her goals. The CUE is an environment that allows a user to activate a particular element of information that is categorized under one of six fundamental classes of information: personas (who), documents (what), events (when), locations (where), goals (why) and resources (how). Once activated, that element of information becomes the centricity of the system, i.e., the element situated at the center. All information elements that have been explicitly linked with the centricity element are presented through their associated links with that centricity element. All actions within the system that the user can perform are focused to only those actions associated, or linked, with the centricity element thorough the resources available to the user at their current location. The user can then activate a linked information element, and switch the centricity to that new element. This chaining of information elements through associated links, and focusing of actions to that which can be performed to that centricity element, dramatically simplifies the use of the computing device and the overall effectiveness of the user of the environment.

In general, conventional computers and other electronic devices represent data generically and act upon that data with software tools. In the environment provided by interface engine 110, from such data are extracted six categories of information modeled by objects. "Who" objects represent personas such as a person or a group. "When" objects represent events such as a meeting or reminder. "Where" objects represent locations, such as a street address or an Internet location (i.e., domain name). "Why" objects represent goals such as a to-do item, a task, or a project.

A fifth category of "What" objects provides a repository of generic data that cannot be classified into one of the five other categories, such as generic documents or folders.

A sixth category of "How" objects correspond to software tools and represent resources such as a particular tool (e.g., web browser), role (e.g., vice president), or script (e.g., macro).

The result of this extraction of information is six categories that mirror the standard interrogatories used by news reporters in investigating and documenting a story. Reporters select these interrogatories because the answers to them provide all of the information necessary to provide the audience with the complete story. Interface 110 applies like considerations to an environment for interaction with a machine. The center "now" portion 127 of wheel 120 provides an additional access mechanism corresponding to a "Now" view that represent all CUE information objects that are currently in use.

For example, if architecture 100 is implemented for use with a television monitor coupled to a number of program sources, selection of the "who" portion provides the user with listings of the people (i.e., television or movie stars) who may be accessed (in this case, viewed) using the television monitor. Selection of the "what" portion allows the user to choose from various program choices; selection of "when" provides a schedule of programs; selection of "where" provides a listing of programs by channel or other source; selection of "why" provides categorical listing of programs by type or goal, e.g., "educational"; selection of "how" provides control over tools used for accessing programs, e.g., selection of satellite receiver source as opposed to cable; and selection of "now" portion 127 provides control over currently broadcast programs.

By selecting one of the six categories, the user is provided with information objects corresponding to the selected category. For example, if the user a CUE object for a particular person and selects the When link tab, all known events relating to that person will be displayed, such as all meetings, deadlines, and the like with which that person has involvement. If the user then activates one of those events, for instance a meeting, and selects the Who link tab, all of the people who are involved in that meeting will be displayed. Accordingly, the user is free to continually change their centricity (active object) in the manner most useful to the user. As discussed in greater detail below, such an environment provides particular benefits when extended to a distributed hierarchical network of generalized computer servers.

In one embodiment, wheel 120 is implemented as a display on a video screen such as may be found in a television or computer monitor. In another embodiment, wheel 120 is implemented as a physical disk with conventional sensors to indicate selection of a particular portion 121–127. In this latter embodiment, wheel 120 is constructed as physical device approximately 1.5 inches in diameter and ⅓ inches in height, and includes electronic memory such as semiconductor FLASH random access memory, with physical connections for electronic coupling to an associated device, the physical connections (not shown) being disposed on the underside of wheel 120. In an alternative embodiment, wheel 120 is coupled in a conventional wireless fashion to a cooperating machine 100, for example through an infrared link. In some embodiments, wheel 120 may include buttons for the selection of each of the seven portions 121–127, while in other embodiments selection of those embodiments is achievable through buttons or other devices provided by machine 100. It should be recognized that wheel 120 need not be circular in shape, but could be formed in some other shape that provides clear selection of predetermined categories of data. In one alternate embodiment, wheel 120 could be implemented in the shape of a hexagon; in another alternate embodiment, wheel 120 could be implemented in the shape of a star.

As noted above, each category of interface wheel 120 corresponds with a class of objects. The sections that follow describe the objects used in a preferred embodiment.

Who objects include two subclasses: Person and Group. Person objects are primarily used to represent real world people and to facilitate communications with other Who objects. Group objects are primarily used to represent organizations and to group person objects together via links.

All communication between Person objects occurs via resource objects that represent some communications capability, such as modem objects, email objects, and the like. Depending on the type of resource object, communications may be either synchronous or asynchronous. Synchronous communications involve connection of a resource to a remote resource, followed by data transfer independent of architecture 100, for instance a human-to-human telephone call. Asynchronous communications involve movement of data using architecture 100, and more specifically via an object known as a transport object. Communication is supported by two methods.

A GetResourceActions(OID Destination_Who_OID) method invoked on a Who object returns a list of all actions (e.g., send email, call on telephone, etc.) that can be performed by that Who object with the destination Who object.

A "collaboration" is a type of communication that takes place in a specific logical location. In the embodiment of architecture 100, that location is known as a meeting room. Meeting room objects are discussed in detail below in connection with Where objects. When a Who object enters a meeting room, a copy of a MeetingRoom object is created in the engine of the Who object and is called a MeetingRoom-Proxy object, also discussed in greater detail in connection with Where objects, below. Collaboration is supported by two methods.

A Collaborate(OID Meeting_Room_OID) method returns a MeetingRoom_Proxy object, which can then be used to interact within a meeting. This method essentially returns a copy of the MeetingRoom object and casts it as a MeetingRoom_Proxy object class.

A Collaborate(OID Who_OID) overloaded method returns the MeetingRoom_Proxy object that represents the personal meeting room of the Who OID specified in the parameter list.

Turning now to What objects, these represent unstructured data, i.e., data for which there are no encapsulated methods. Architecture 100 imposes organization on such data by encapsulating the references to the data, along with methods for acting upon those references. This is true of the subclasses FileSystemFolder, FileSystemDocument, and URL. A subclass Document does not have such structure imposed, as it is used for objects that merely contain raw data and nothing else. FileSystemFolder and FileSystemDocument objects are implicitly created when the user accesses a folder or document in the file system. These objects are permanently stored in the CUE engine. URL and Document objects are explicitly created by the user. What objects are supported by a WhatCreateDocumentObject( ) method, which returns a Document object with the contents of the file references in the What object. For FileSystemDocument objects, a data stream is opened to the file and the contents are stored in binary format. For FileSystemFolder objects, the directory contents are retrieved and stored in ASCII format. For URL objects, the corresponding URL (Uniform Resource Locator) is parsed to identify the appropriate protocol for transferring the document. That protocol is then used to retrieve the contents of the referenced document and the resulting data are stored.

When objects encapsulate time-based events and methods to act upon those events. When objects include Meeting objects and Reminder objects. The contents of such objects include time and text based data and methods for creating that data. Typically, CUE links, discussed below, are used to acquire most of the semantic information associated with these objects.

Meeting objects provide methods for dealing with attendance and providing a meeting location. Specifically, an AssignMeetingRoom(OID MeetingRoom_OID) method links the specified MeetingRoom object to the current Meeting object. A ConfirmAttendance(OID Who_OID) method records that the specified Who_OID is going to attend the current meeting. A DeclineAttendance(OID Who_OID) method records that the specified Who_OID) will not attend the meeting. A QueryAttendees( ) method returns a list of Who OIDs and their current attendance status. A NotifyAttendees(String message) method notifies all attendee Who OIDs of changes to the Meeting object. An AddAttendee(OID Who_OID) method adds the specified Who OID to the group of attendees. A RemoveAttendee (OID Who_OID) method removes the specified Who OID from the group of attendees.

Where objects represent locations, both physical and logical (e.g., network-based). Subclasses of Where objects are PhysicalLocation, InternetLocation, MeetingRoom, and MeetingRoomProxy. The first two of these are defined simply by their attributes and the methods to get and set those attributes.

The MeetingRoom object represents a logical location where meeting contents can be stored and from which meeting contents can be distributed. The location of a MeetingRoom object is specified by a location indicator, such as a UNC identifier. The MeetingRoom object provides space for attendees to store documents and cause documents to be distributed, via links, to other attendees. It also uses links to keep track of attendees, where they are located, and when they arrive and depart. Attendees may bring documents to a meeting by posting references to them via FileSystemDocument or URL objects or by posting an actual copy of such documents via Document objects. The MeetingRoom objects are configured to archive all activity occurring during a meeting, such as conversation transcripts, copies of documents, attendance records. All users that are to attend a meeting receive a copy of a meeting room OID, which is used to create a MeetingRoomProxy object pointing to the actual MeetingRoom_Proxy object. All operations on the MeetingRoom object are performed using this proxy. MeetingRoom objects are supported by six methods.

An EnterMeetingRoom(OID Who_OID, OID Where_OID) method is invoked on a MeetingRoomProxy object communicating the Who_OID indicated in the parameter to the MeetingRoom object. The MeetingRoom object records the time of attendance into an attendance log. All current attendees, identified by the linked Who_OIDs, are notified of the new Who_OID and the corresponding Where_OID location.

An ExitMeetingRoom(OID Who_OID) method records in an attendance log the time the Who_OID exited the MeetingRoom, and informs all remaining attendees of the exiting Who_OID.

A PostDocument(OID What_OID) method posts a copy of the What_OID in the parameter to a local storage space for this meeting room and records the OID owning the document to the meeting log. The What object is distributed to all attendees via their Location OID objects.

A DeleteDocument(OID What_OID) method enables the owner of a document to remove the document from the MeetingRoom and copies from the attendees' MeetingRoomProxies.

Why objects form the basis for project and workflow management. The three primary subclasses of the Why class are: Projects, Tasks, and Actions. A project is a container of tasks, and is used to organize tasks for the purpose of accomplishing an overall goal. Tasks are defined by a set of required input and output parameters that must be fully specified before the task is considered to be completed, and its individual goal accomplished. Tasks only work within the confines of a project. Actions are similar to tasks but operate independently of projects.

More specifically, a project is a container and organizer of tasks. To support input/output requirements of tasks, a project includes "slots" that represent storage areas for task input/output OIDs. The number of slots and their required object types are determined by the task objects that are linked to the project object. A slot table is defined in the project so that it can be shared by multiple tasks to allow for the creation of dependency between tasks via the CUE Objects, discussed below. The project object class is supported by five methods.

An AddTask(OID Why_OID) method links a Why object to a current project. The project then analyzes the input/output requirements of the child object in order to build the necessary slots. The user can merge slots from multiple siblings, i.e., task objects that are in the same project, in order to create dependency among CUE Objects created by each Why object.

A RemoveTask(OID Why_OID) method unlinks the specified task and removes associated slots from the project.

A WhyStart( ) method creates a copy of the object and all contained Why objects. The first Why object in the copied project is then started. Copies are used to allow reuse of the original projects/tasks.

A Suspend( ) method suspends all processing within the current project.

A Terminate( ) method prematurely terminates the current project.

An Action object is a stand-alone task that contains processes as does a task but exists outside the context of a project. The methods available to support the Action objects correspond to those available to support Task objects.

How objects represent resources that are available to a user. Such resources consist of hardware and software references that have been encapsulated with methods defining a set of actions a user can perform on or with the hardware or software. The primary subclasses of the How class are: Script, SoftwareTool, Role, ToolBin, and CommunicationTool.

A script object represents a reusable piece of code written in a scripting language, such as the language known as JAVAScript. A script is an independent entity that can be linked to other objects such as tasks. Scripts can operate upon other resource objects. A ResourceTable is provided in the Script object to store references to resources that the Script requires, and methods are provided to operate upon those resources. For example, a Script might be designed to dial a modem and download a file from a specific host on the Internet. The Script requires access to a modem resource in order to operate, and a modem resource object is therefore referenced in the ResourceTable to permit the Script to use it. The ResourceTable also facilitates Script object reuse by identifying at an early stage wheat resources a particular Script requires. Seven methods support Script objects.

A Run( ) method begins executing a Script object script. A Terminate( ) method terminates execution of the script. A Suspend( ) method suspends execution of the script. A Resume( ) method resumes execution of a suspended script. An AddResource(OID Resource_OID) method adds a specified resource to the ResourceTable. A RemoveResource (OID Resource_OID) removes a specified resource from the ResourceTable. A QueryResourceTable(command) returns information regarding the contents of the ResourceTable.

SoftwareTool objects encapsulate a particular executable file within a CUE object to allow existing software to be integrated into architecture 100. Since the software may not know that it is operating within architecture 100, this object simply provides a mechanism for verifying the authenticity of the software. Two methods support this object.

A ToolSign(RSA_Key Private_Key) method generates a hash of the software code module and signs the hash with a supplied private key according to the conventional RSA protocol for public key cryptography and digital signature systems.

A ToolValidateSignature(RSA_Key Public_Key) method verifies the digital signature of the object, again in accordance with the conventional RSA protocol.

A role object represents a particular role that can be assumed by another object, commonly a Who object. Roles provide alternate identities to other objects without modifying the object. For instance, a person object can be assigned an alternate identity of "vice president." Three methods support the role class of objects.

An Assign(OID object) method assigns the current role to the specified object.

A Revoke(OID object) method revokes the current Role from the specified object.

A QueryAssignees( ) method returns a list of OIDs that are assigned to the current Role.

A ToolBin is an object for grouping SoftwareTool objects, and contains a ToolTable attribute that stores references to Tool objects. Three methods support ToolBin objects.

An AddTool(OID How_OID) method adds the specified How_OID to the ToolTable.

A RemoveTool(OID How_OID) method removes the specified How_OID from the ToolTable.

A QueryToolBin( ) method returns a list of OIDs of How objects contained in the ToolTable.

A CommunicationTool class of objects is a subclass of SoftwareTool objects and provides a mechanism for incorporating hardware-based communications tools into architecture 100. The subclasses of this class are Facsimile, Telephone, Mailbox, EMailBox, Modem, and NetworkPort. These classes simply describe the items that they encapsulate.

It should be recognized that significantly different sets of objects and methods may also be used, depending on a desired application for architecture 100. The sets of objects and methods most useful for any particular application will be apparent to those skilled in the art.

Figure 4:
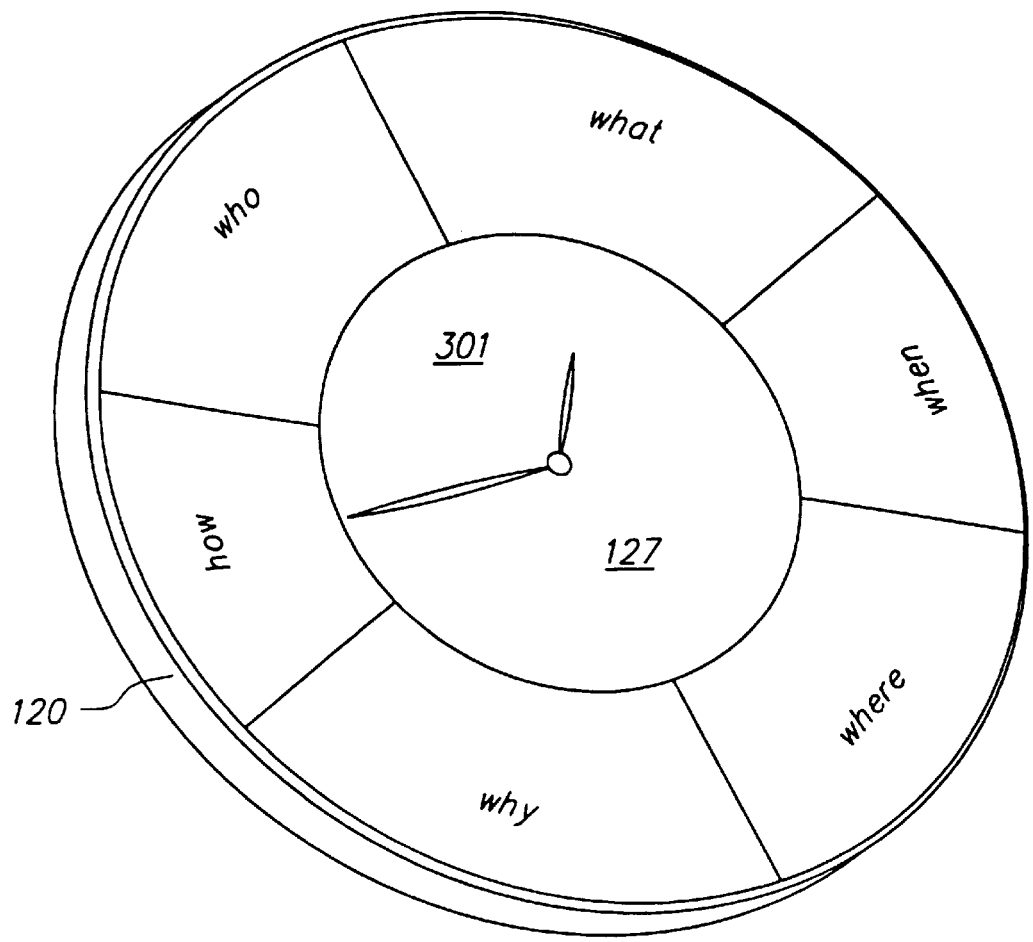
FIG. 4 is an illustration of a CUE disk in accordance with the present invention.
Figure 5:
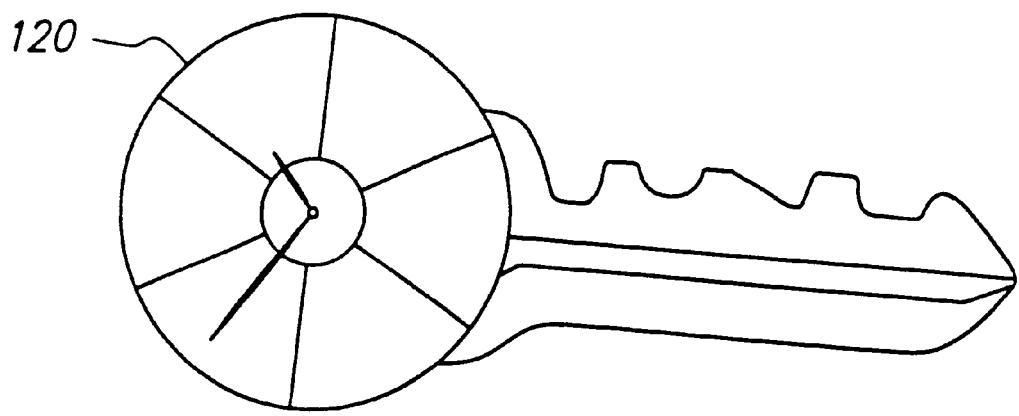
FIG. 5 is an illustration of a key adapted for use with an interface wheel in accordance with the present invention.
Figure 6:
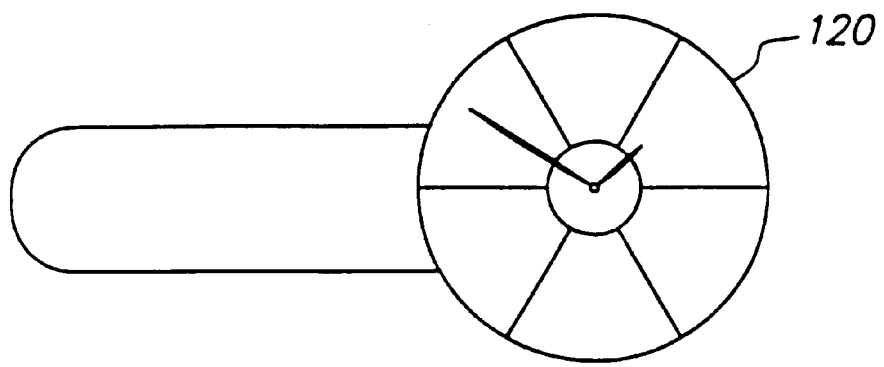
FIG. 6 is an illustration of a magnetic key adapted for use with an interface wheel in accordance with the present invention.

Referring now to FIG. 4, there is shown an embodiment of interface wheel 120 in which a clock display 301 is implemented in the central Now portion 127 of display wheel 120. Inclusion of clock display 301 not only provides a user with the current time, but also provides, without the need for words, a reminder that central portion 127 corresponds to current information.

Referring now to FIG. 7, there is shown an embodiment in which interface wheel 120 is a physical disk integrated with a conventional PC-MCIA interface card 401 for connection with a computer (not shown). Interface wheel 120 for use in this embodiment may be implemented either as a permanent part of card 401, or may be detachably mounted for use with other devices as well.

Referring now to FIG. 10, there is shown an embodiment in which interface wheel 120 is physically integrated with a wristwatch 501. This implementation simply may be used to provide a convenient and secure way to transport a user's interface wheel 120 and identity from one computer to another or may provide conventional functionality for wired or wireless coupling to a machine operable in the centricity user environment described herein. FIGS. 8, 9, 5, and 6 illustrate other embodiments using a pocket watch 601, a key chain 701, a conventional key 801 and a magnetic key 901, respectively.

Figure 11:
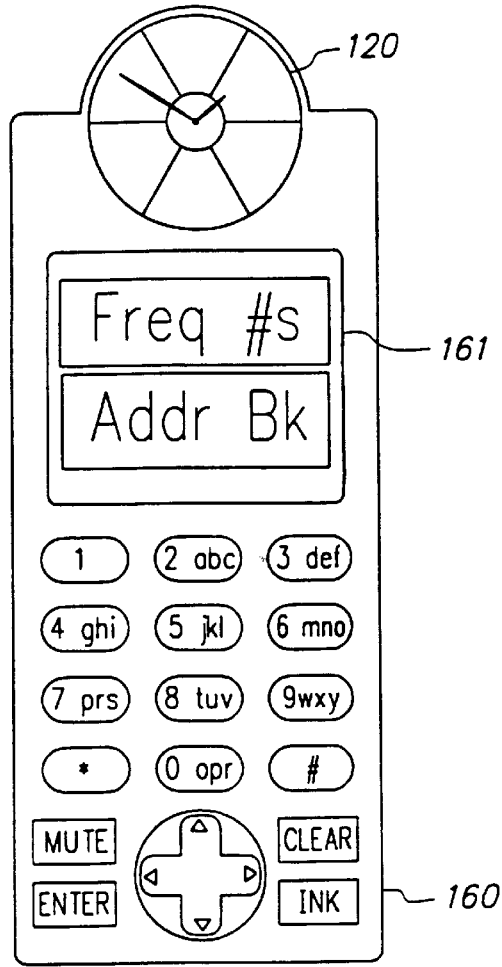
FIG. 11 is an illustration of a controller adapted for use with an interface wheel in accordance with the present invention.

Referring now to FIG. 11, there is shown a controller 160 adapted to accept wheel 120. Controller 160 is adapted to provide universal control of various devices operating in accordance with the environment provided by wheel 120. In the embodiment shown, controller 160 includes a display screen 161. In one application, controller 160 can serve as a personal digital assistant class of computer, providing address and scheduling information using in conformance with the environment provided by wheel 120. In another application, controller 160 may provide remote control of a variety of electronic devices. Information to be accessed through controller 160 may be stored in a memory portion of wheel 120, may be stored in controller 160, may be stored in computer systems or networks external to, but communicating with, controller 160, or may be distributed among these facilities.

Figure 12:
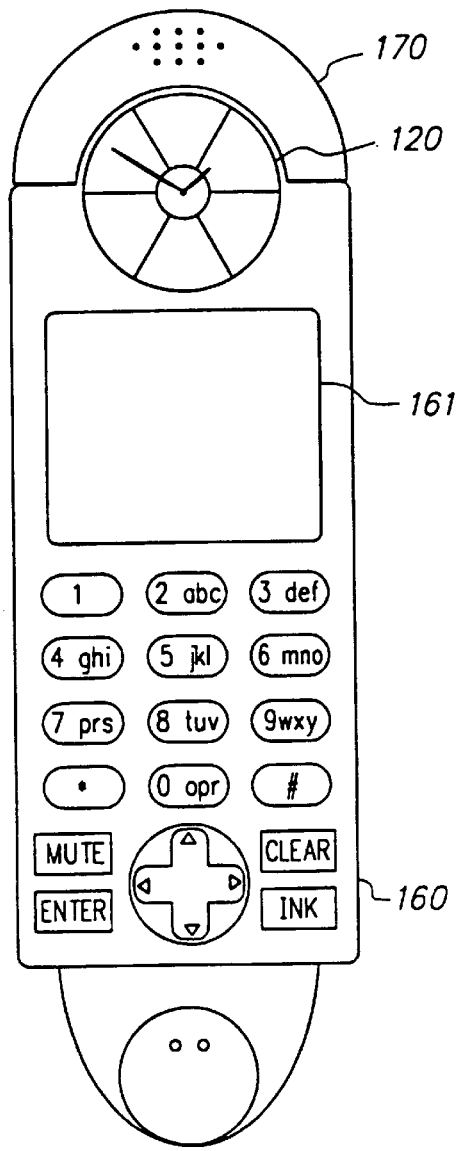
FIG. 12 is an illustration of a telephone adapted for use with the controller illustrated in FIG. 11.

Referring now also to FIG. 12, controller 160 may also be adapted for detachable mounting to a telephone unit 170 to allow control of such telephone unit 170 in accordance with the user environment provided by wheel 120. It should be noted that telephone unit 170 may be a corded, cordless, or cellular type telephone.

Referring now to FIG. 13, there is shown a conventional electronic game device 850 coupled to control units 851, 852, each including an interface wheel 120. In operation, users may insert their own interface wheels 120 into a control unit, e.g., 851, in a manner that provides user-specific information to electronic game device 850 in accordance with the user environment provided by interface wheel 120. For example, a first user may have pre-set game strategy parameters that are applied as defaults whenever the first user is playing against a particular second user, and a Who category object may automatically query the game device 850 to determine whether the identity of the other player is matches any players for whom a preselected set of strategy parameters exists.

Referring now to FIG. 15, a computer keyboard 853 includes an interface wheel 120. By being configured for detachable coupling of interface wheel 120, keyboard 853 allows users of a public computer to quickly configure the computer to the user's needs, connect to networks and services particular to the computer, and provide the user with full, customized, computing resources, all in accordance with the user environment provided by wheel 120.

Referring now to FIG. 14, a public telephone 854 includes an interface wheel 120. By being configured for detachable coupling of interface wheel 120, telephone 854 allows users to quickly connect to commonly used numbers, bill the call to a predetermined account, and so forth, all in accordance with the user environment provided by wheel 120.

Figure 16:
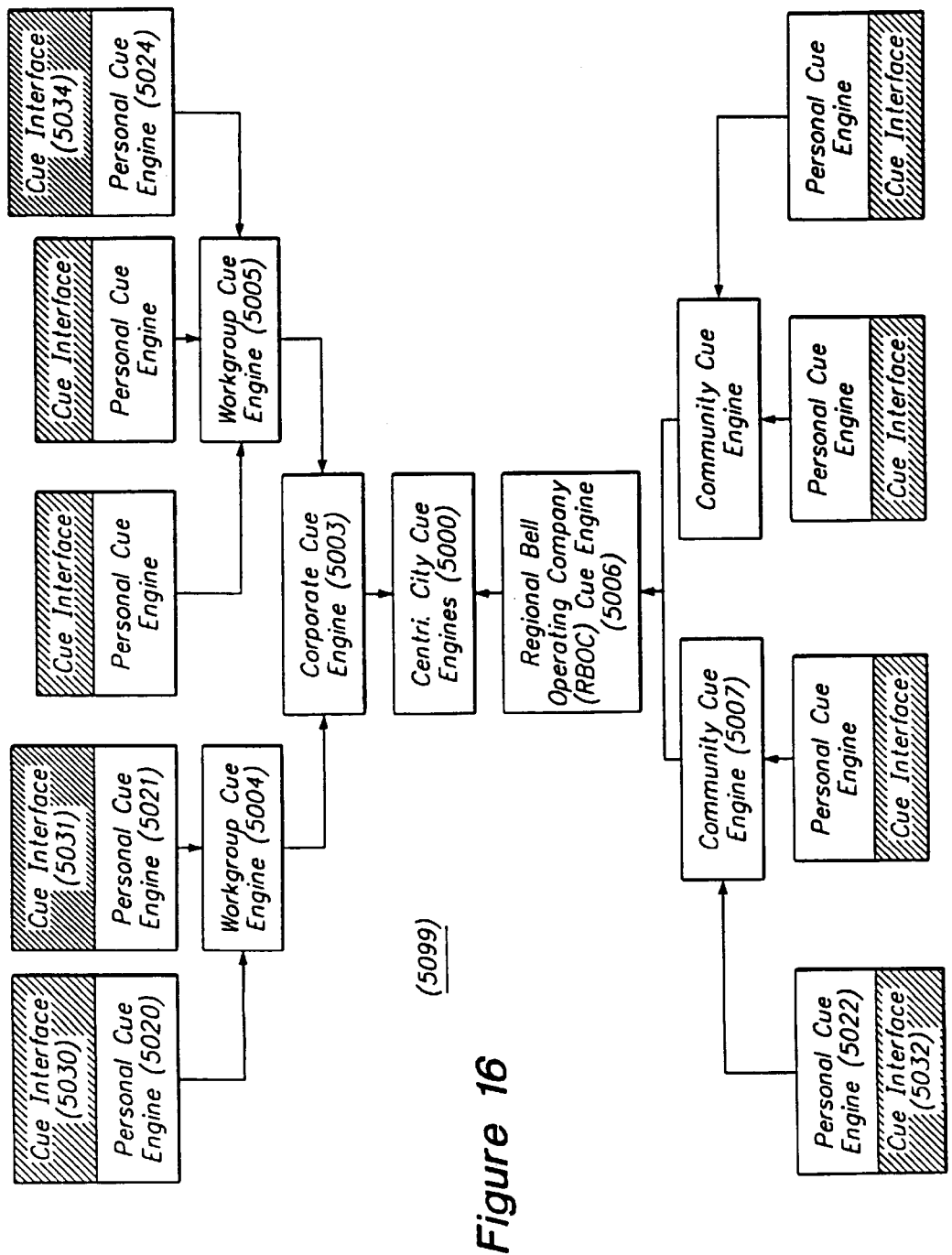
FIG. 16 illustrates a network, in accordance with the present invention.
Figure 17:
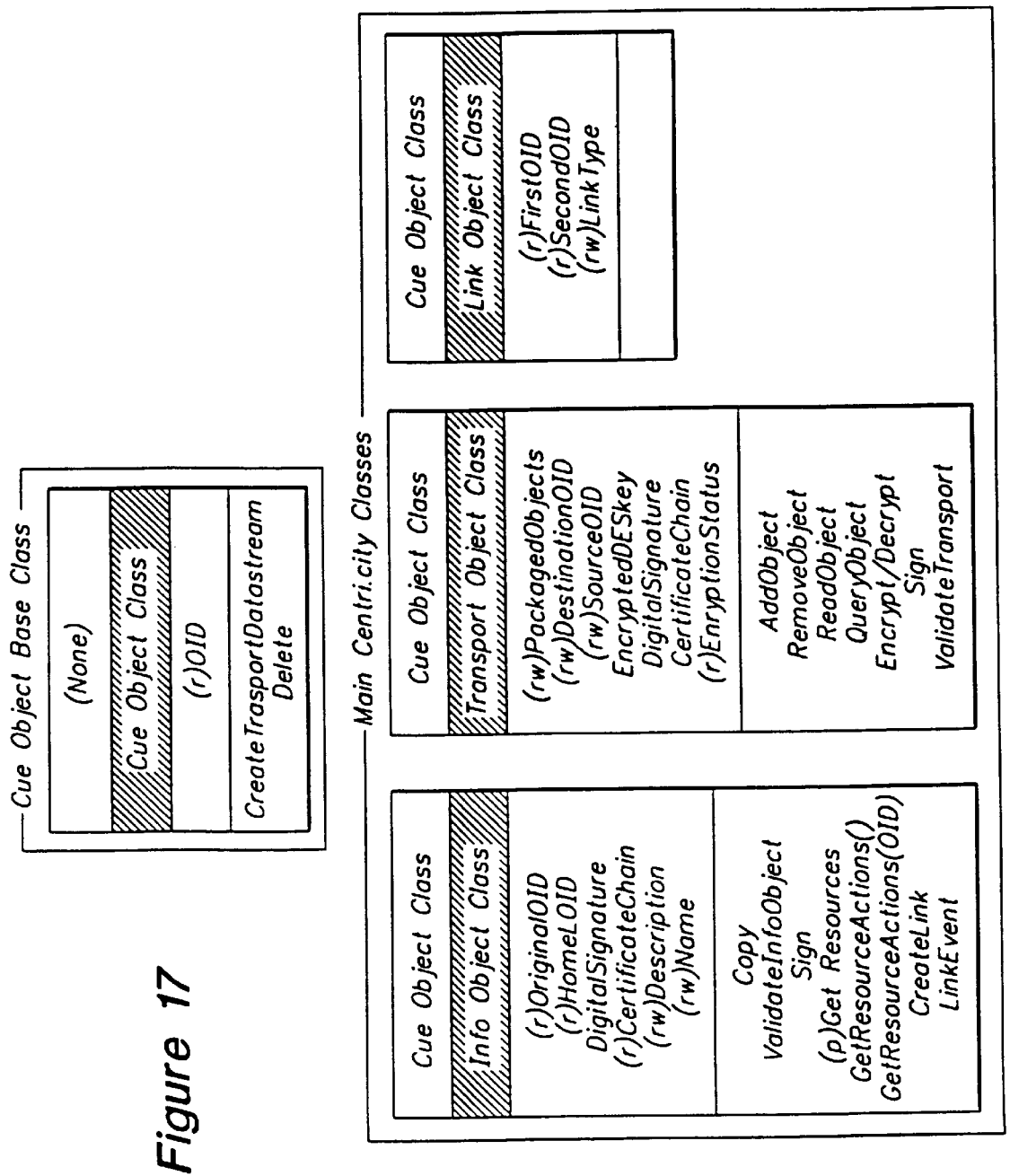
FIGS. 17–22 illustrate and define objects used in architecture 100, in accordance with the present invention.
Figure 18:
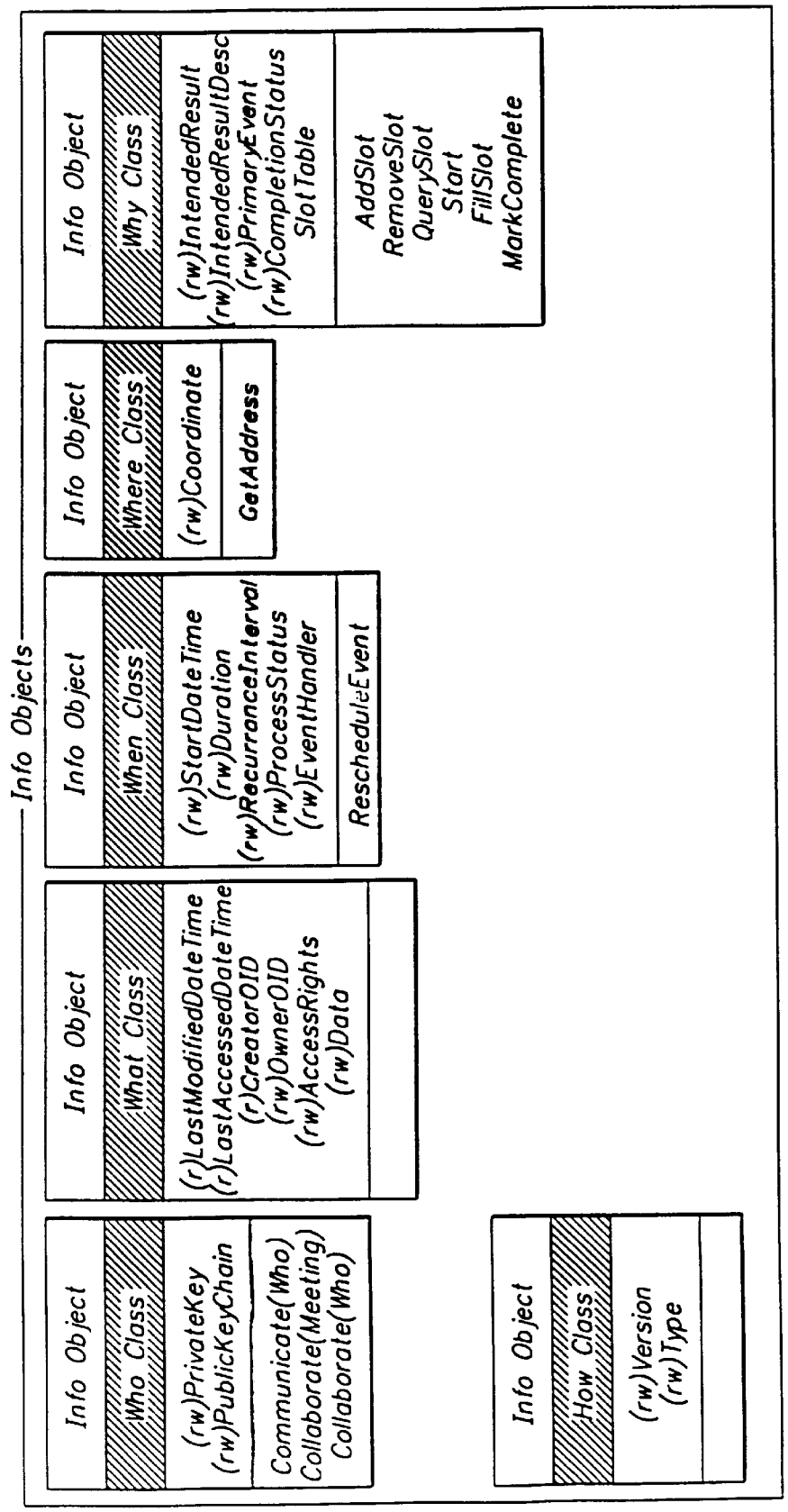
Figure 19:
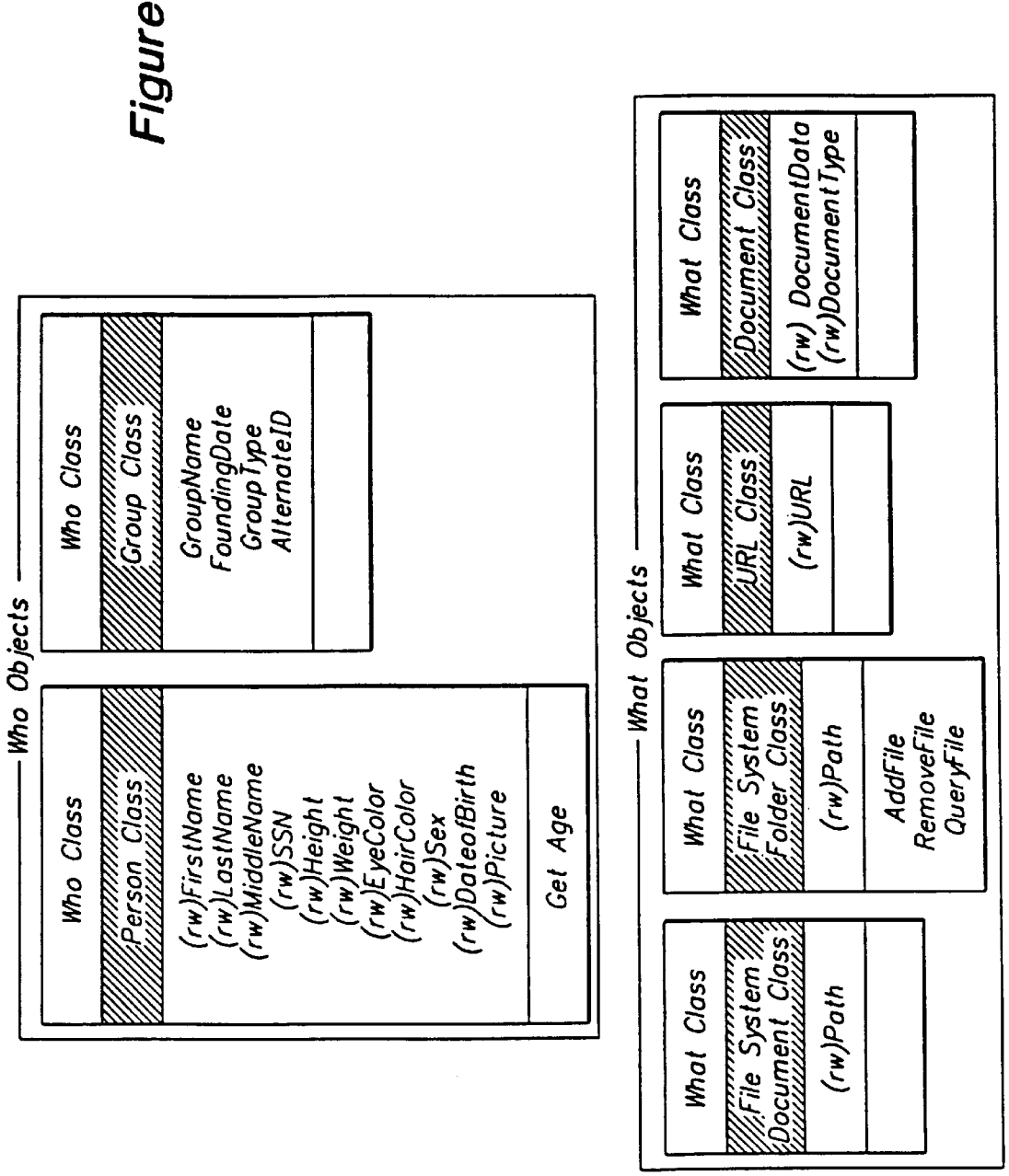
Figure 20:
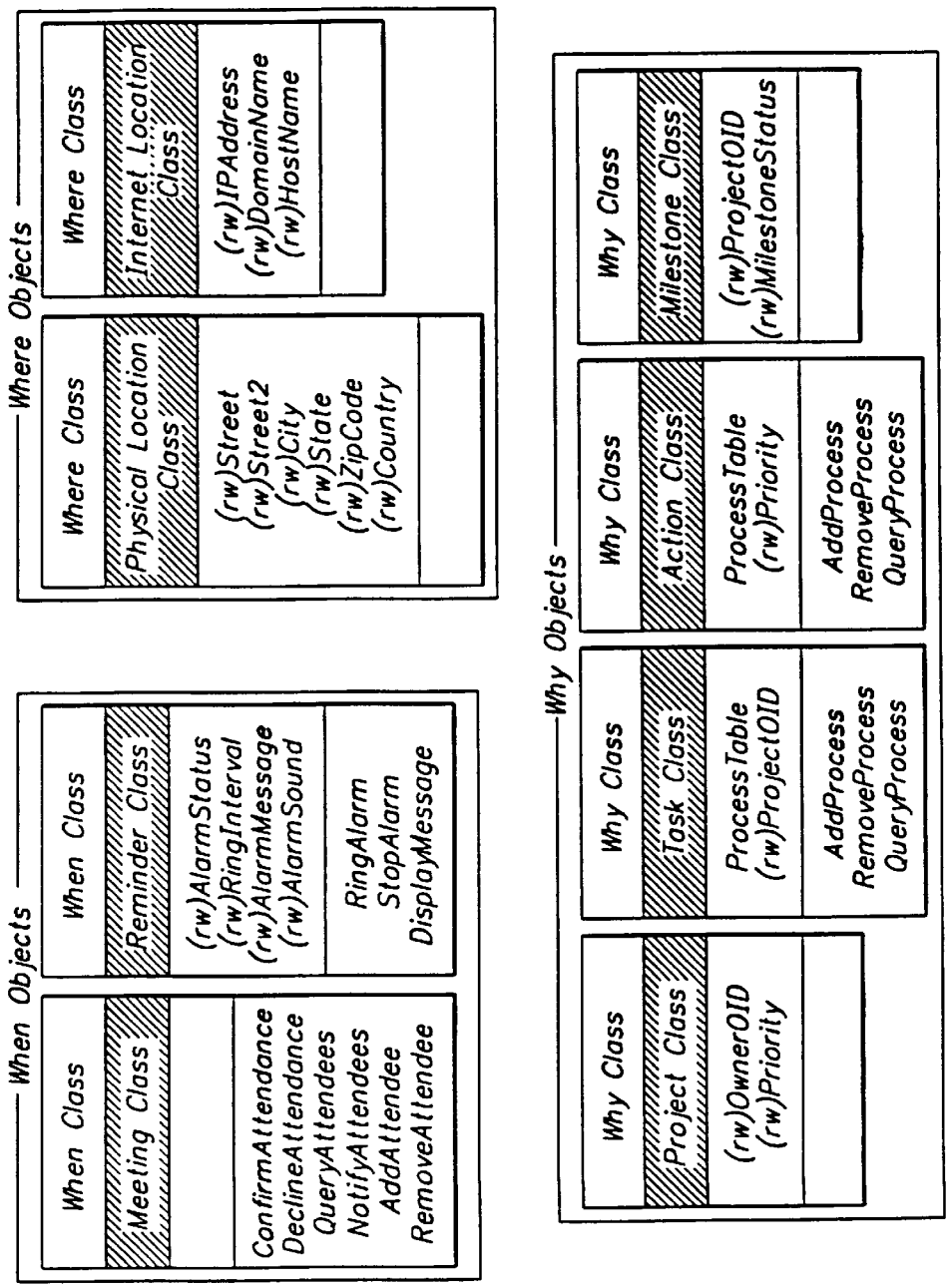
Figure 21:
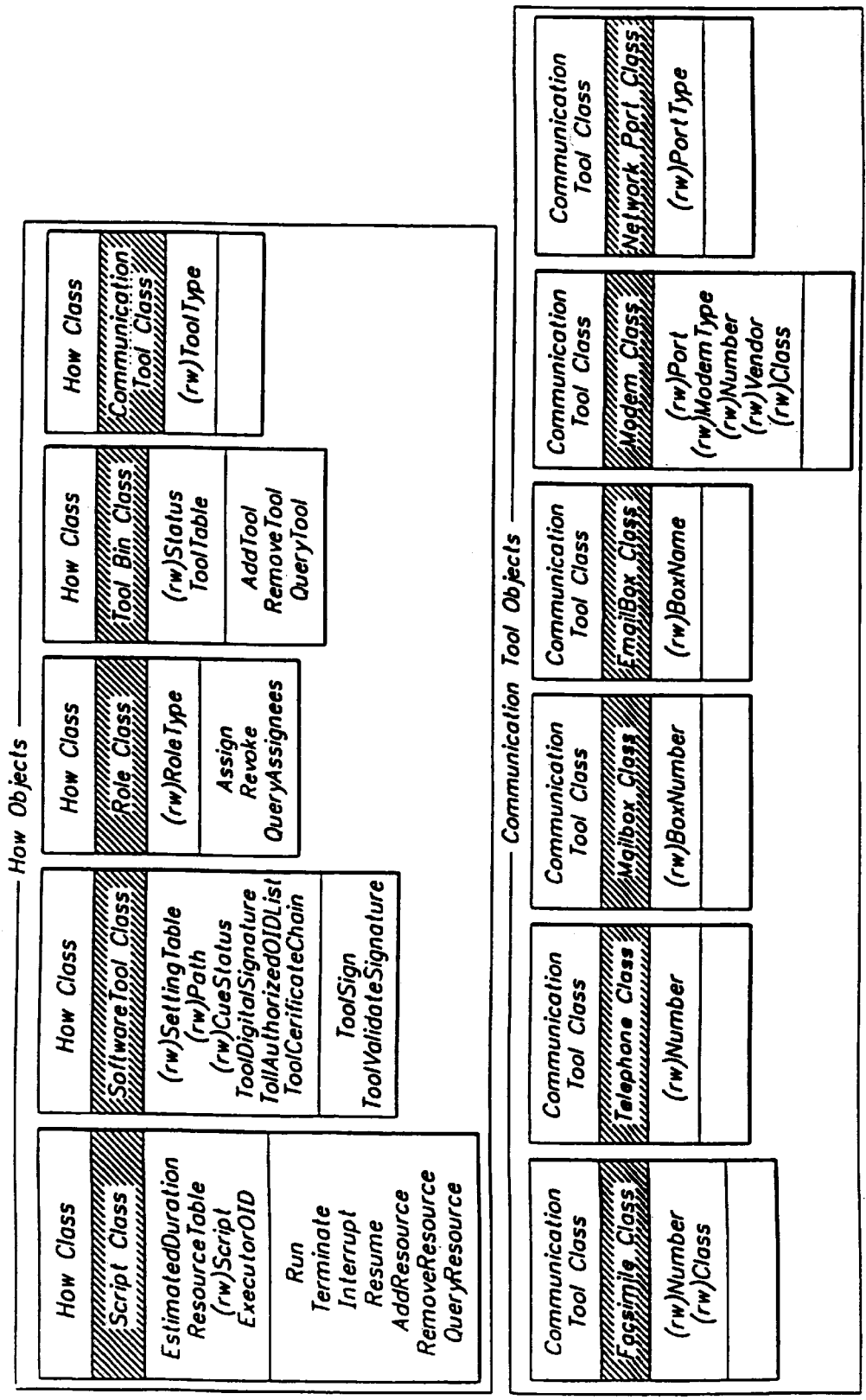
Figure 22:
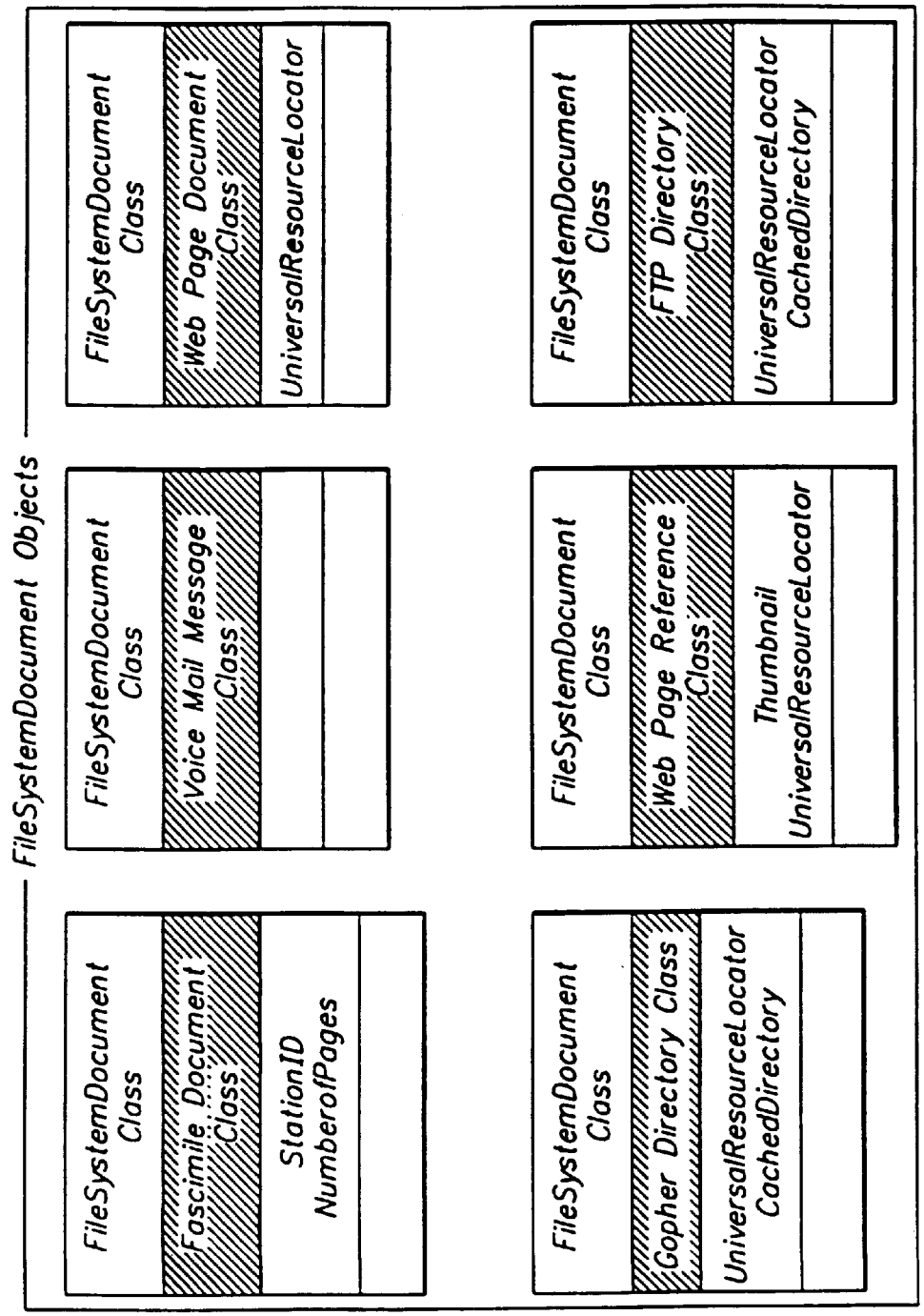

The user environment provided by wheel 120 is readily enhanced among distributed resources, particularly to a network of hierarchically organized CUE Engines. Referring now to FIG. 16, there is shown such a network 5099 of CUE Engines 5000, 5003, 5004, 5020. Each CUE Engine resides on a particular computing device (workstation 5020 or server 5004) and may have associated with it a CUE Interface 5030 on that workstation 5020. Network 5099 provides for propagation of CUE Objects, discussed below, to appropriate locations throughout network 5099. Each public Info Object (Who, What, When, Where, Why, How) created within any particular CUE Engine is automatically packaged with its associated links and Info Objects into a Transport Object and moved upward in the organizational hierarchy. As an example when a user of the CUE Interface 5030 first creates a Person object representing themselves, Resource objects for their phone and fax, and a Location object for their home Internet address (of their workstation) with their CUE Engine 5020, copies of these objects and links would be automatically inserted into a new Transport object and transferred to the Workgroup CUE Engine 5004. The Workgroup CUE Engine 5004 would, upon receipt of the Transport object, create these objects and forward the Transport object to the next level in the hierarchy 5003. The Corporate CUE Engine 5003 would then create these objects and forward the transport object to the next level in the hierarchy 5000. The transport object would then be taken apart to form the objects within the Centri.City engine(s) 5000. Each object created in the Engines along the hierarchy represents a copy of the original object with only the attributes marked as public being copied from the original to the copy (e.g., if a person's Social Security Number is marked private, it is not transferred to the copy of the object).

The purpose for the design of the network 5099 is in the automatic delivery of Transport objects between users of the network. Traditional network topologies require the user to maintain the address and access mechanism for any other user they are trying to communicate with (e.g., email address ... rich@CUEsys.com). As an example of use of the present network, a user of the CUE Interface 5032 creates a document object with their CUE Engine 5022 and wishes to send it to the user of CUE Interface 5030 via their CUE Engine 5020. The process for accomplishing this is to create a Transport object with the Document object as the content. The user then sets the receiver of the Transport object with the OID of the person (user) at 5030. The Transport object moves to the next level in the hierarchy 5007. This Engine checks its database for the a Who object matching the OID of the receiver of the Transport object. If it cannot locate this, it forwards the Transport object to the CUE Engine at the next level of the hierarchy 5000. This is the Centri.City CUE Engine 5000, which in a preferred embodiment has in its engine copies of all objects that have been marked public. The engine 5000 finds the Person OID for the user of 5030 and marks the Transport object to send directly to the location linked to this OID (that being the Location object previously created and linked to this Person object in the above paragraph). The Transport object thus is forwarded directly to the Personal CUE Engine 5020 and the user of the CUE Interface 5030 receives the Transport object and extracts the Document object it contains, successfully completing the communication. The main strength of this design is in the limited knowledge any sender must have of the receivers location to communicate with them, i.e., their OID.

In a preferred embodiment, the physical topology of the network 5099 is WAN (Internet) based for connection of the Centri.City CUE Engines 5000 and the Corporation 5003 CUE Engines while the Workgroup 5004 and Personal 5020 & 5021 CUE Engines are LAN-connected to the Corporate CUE Engine 5003. In a likewise fashion the Centri.City CUE Engines are WAN-connected to the RBOC 5006 CUE Engines and Community 5007 CUE Engines and connected to the Personal 5022 CUE Engines via telephone lines. This configuration creates a heterogeneous network solution for communication and collaboration among the disparate users of this network system.

An advantage of using a hierarchical organization in network 5099 rather than a peer to peer organization such as used in the World Wide Web is that the hierarchical organization is more efficient, partly because it mirrors the way that corporations and other entities operate. Specifically, requests for decisions typically flow up the hierarchy and decisions typically flow down the hierarchy. This is a natural result of the Agents (Engines) at higher levels having greater contextual knowledge than Agents (Engines) at lower levels. Accordingly, if an Engine at one level does not contain enough information to make a decision, responsibility for that decision gets transferred to the next higher level.

Thus, the user environment provided by wheel 120 provides users with the means to access and act upon the categorized data objects, while the network 5099 provides a mechanism for distributing those data objects.

As a further disdosure, the following paragraphs provide exemplary descriptions illustrating the preferred embodiments.

From the above description, it will be apparent that the invention disclosed herein provides a novel and advantageous system and method providing a centricity user environment. The foregoing discussion discloses -and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method for organizing information in a computer network, the method comprising:

arranging a plurality of information processing engines hierarchically into said computer network; and for each of said processing engines, categorizing information corresponding to that engine and to ones of said processing engines hierarchically subordinate to that engine, said categorizing including choosing portions of information as belonging to one of a plurality of categories, the categories including a "who" category pertaining to personas, a "when" category pertaining to events, a "where" category pertaining to locations, a "why" category pertaining to goals, a "what" category pertaining to unstructured objects, and a "how" category pertaining to resources.

2. A method as in claim 1, wherein the categories further include a "now" category pertaining to current objects.

3. A computer-implemented method of accessing and manipulating items of information by a user, comprising:

categorizing the items of information in a plurality of classes, the classes including a "who" class pertaining to persona objects, a "when" class pertaining to event objects, a "where" class pertaining to location objects, a "why" class pertaining to goal objects, a "what" class pertaining to unstructured information objects, and a "how" class pertaining to resource objects;

generating links to form associations among pairs of the items;

selecting one of the items as a centricity element; and selectively making available to the user a subset of said links and associated ones of said items of information in response to correspondence between each of said links and said centricity element.

4. A computer-implemented method as in claim 3, wherein the classes further include a "now" class pertaining to current objects.

* * * * *

UNITED STATES PATENT AND TRADEMARK OFFICE
CERTIFICATE OF CORRECTION

PATENT NO. : 6,078,326
DATED : June 20, 2000
INVENTOR(S) : Kilmer, et al

It is certified that error appears in the above-identified patent and that said Letters Patent is hereby corrected as shown below:

[57] ABSTRACT, line 2, amend "an CUE" to --a CUE--;

Column 5, line 39, add a period after "ImpI)";

Column 7, line 38, amend "consists" to --consists of--;

Column 7, line 60, amend "Each if" to --Each of--;

Column 8, line 3, amend "dockwise" to --clockwise--;

Column 8, line 22, amend "dicks" to --clicks--;

Column 9, line 62, amend "dicks" to --clicks--;

Column 10, line 54, amend "thorough" to --through--;

Column 15, line 8, amend "wheat" to --what--;

Column 16, line 58, after "player" delete the word --is--; and

UNITED STATES PATENT AND TRADEMARK OFFICE
CERTIFICATE OF CORRECTION

PATENT NO. : 6,078,326
DATED : June 20, 2000
INVENTOR(S) : Kilmer, et al

It is certified that error appears in the above-identified patent and that said Letters Patent is hereby corrected as shown below:

Column 17, line 55, after "the" – delete the article –a–.

Signed and Sealed this

Twenty-fourth Day of April, 2001

Attest:

NICHOLAS P. GODICI

*Attesting Officer*      *Acting Director of the United States Patent and Trademark Office*